United States Patent
Schultheiss et al.

(10) Patent No.: US 7,886,886 B2
(45) Date of Patent: Feb. 15, 2011

(54) VISCOUS FRICTION CLUTCH FOR DRIVING A COOLING FAN IN A MOTOR VEHICLE

(75) Inventors: Gerold Schultheiss, Pforzheim (DE); Rudolf Stoklossa, Meuhlacker (DE)

(73) Assignee: Behr GmbH & Co. KG, Stuttgart (DE)

( * ) Notice: Subject to any disclaimer, the term of this patent is extended or adjusted under 35 U.S.C. 154(b) by 375 days.

(21) Appl. No.: 12/103,188

(22) Filed: Apr. 15, 2008

(65) Prior Publication Data

US 2008/0257677 A1 Oct. 23, 2008

(30) Foreign Application Priority Data

Apr. 23, 2007 (DE) .................. 10 2007 019 088

(51) Int. Cl.
*F16H 35/02* (2006.01)

(52) U.S. Cl. .................. 192/58.5; 192/58.61

(58) Field of Classification Search .......... 192/58.5, 192/58.6, 58.61, 58.7, 58.8
See application file for complete search history.

(56) References Cited

U.S. PATENT DOCUMENTS

| | | | |
|---|---|---|---|
| 4,405,039 A | 9/1983 | Hauser | |
| 4,665,694 A * | 5/1987 | Brunken | 192/58.681 |
| 4,784,247 A * | 11/1988 | Nakamura | 192/58.682 |
| 4,850,465 A | 7/1989 | Ono | |
| 4,903,805 A * | 2/1990 | Ono | 192/58.681 |
| 5,070,980 A | 12/1991 | Nakagawa | |
| 5,099,803 A * | 3/1992 | Nakamura | 192/58.68 |
| 5,452,782 A | 9/1995 | Inoue | |
| 5,593,013 A | 1/1997 | Yamauchi | |
| 5,992,594 A | 11/1999 | Herrie et al. | |
| 6,032,775 A | 3/2000 | Martin | |
| 6,085,881 A * | 7/2000 | Robb | 192/58.682 |
| 6,752,251 B2 * | 6/2004 | May et al. | 192/58.61 |

FOREIGN PATENT DOCUMENTS

| | | |
|---|---|---|
| DE | 37 39 564 | 6/1988 |
| DE | 40 32 029 | 4/1991 |
| DE | 41 03 319 | 8/1991 |
| DE | 44 35 186 | 12/1997 |
| DE | 197 53 725 A1 | 6/1999 |
| DE | 197 42 823 | 5/2004 |
| DE | 600 15 626 | 3/2005 |
| EP | 0 055 853 | 7/1987 |
| EP | 1 418 361 A2 | 5/2004 |
| JP | 57179431 | 11/1982 |

* cited by examiner

*Primary Examiner*—Richard M. Lorence
(74) *Attorney, Agent, or Firm*—Leydig, Voit & Mayer, Ltd.

(57) ABSTRACT

A viscous friction clutch for driving a cooling fan in a motor vehicle is disclosed, wherein the viscous friction clutch comprises a driving disk and a housing, a supply chamber and a working chamber, a device for supplying shear fluid from the supply chamber to the working chamber and a device for returning the shear fluid from the working chamber to the supply chamber.

20 Claims, 4 Drawing Sheets

Figure 5:
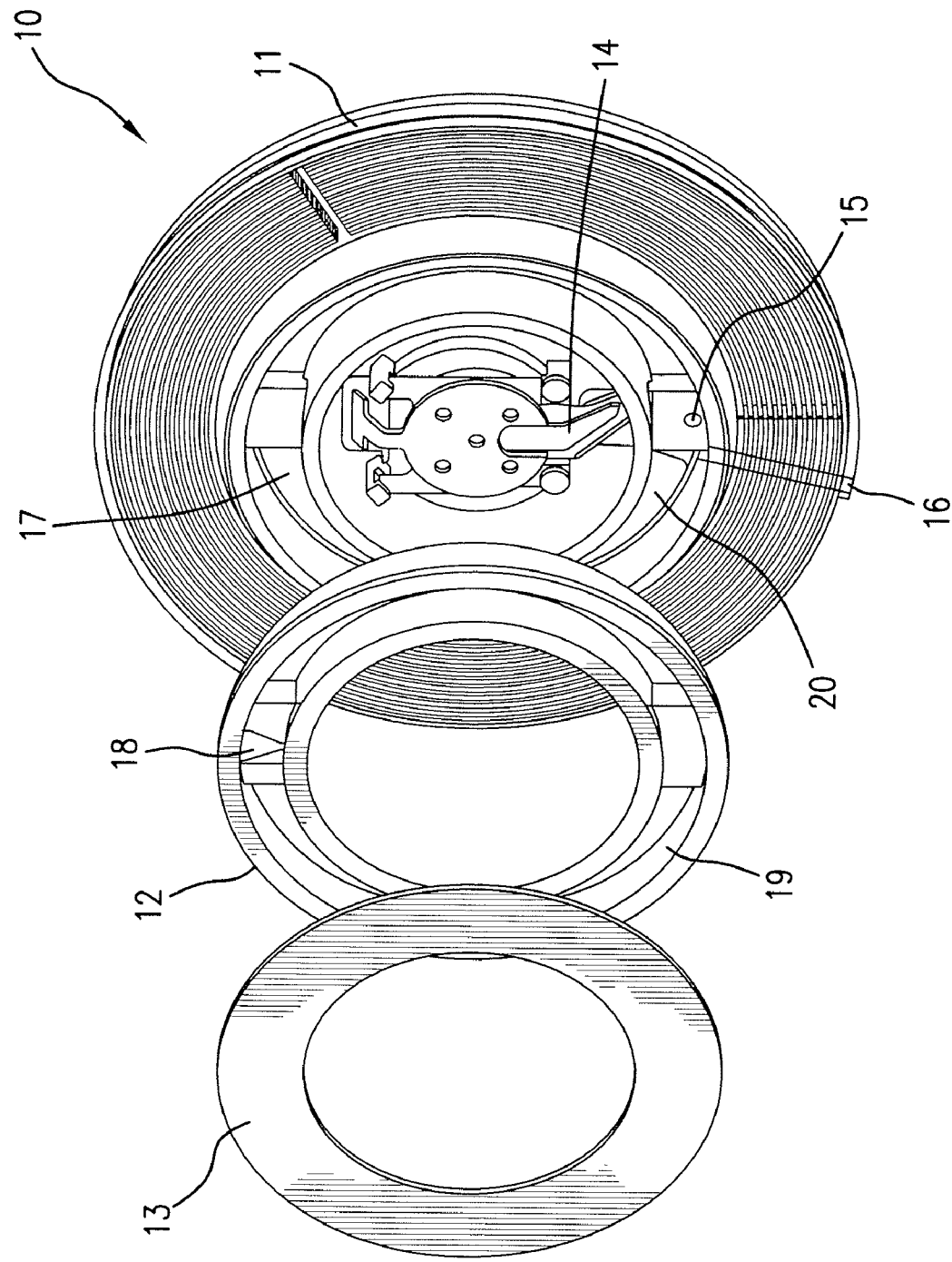

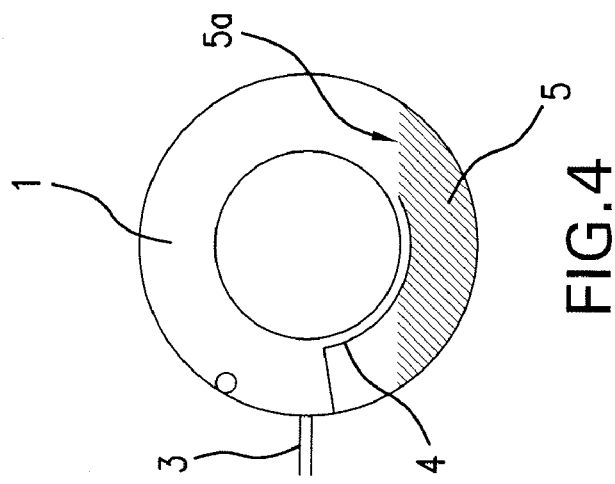
FIG.1
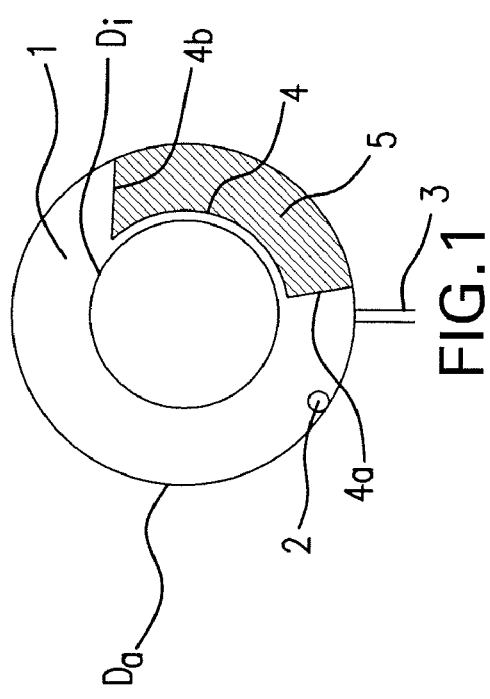
FIG.4
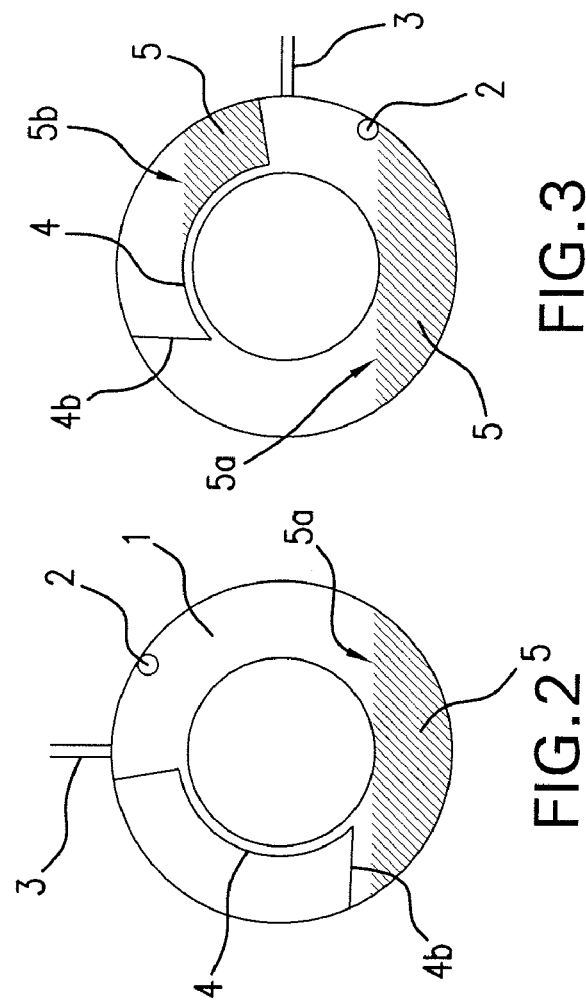
FIG.3
FIG.2

US 7,886,886 B2

VISCOUS FRICTION CLUTCH FOR DRIVING A COOLING FAN IN A MOTOR VEHICLE

BACKGROUND OF THE INVENTION

The invention pertains to a viscous friction clutch according to the preamble of Claim 1 for driving a cooling fan in a motor vehicle.

Viscous friction clutches or so-called viscous clutches are known and preferably used as fan clutches for driving a cooling fan in motor vehicles. The cooling fan is driven by the internal combustion engine of the motor vehicle via the friction clutch, wherein it is known to realize a temperature-dependent control with the aid of a bimetal or electromagnetic control in dependence on various parameters such as, e.g., the coolant temperature. In viscous friction clutches, the torque in a working chamber is transmitted by shearing a shear fluid, for example, commercially available silicone oil. The silicone oil circulates between a supply chamber and the working chamber with the aid of a controlled supply device and a return device. The filling level of the working chamber defines the transmittable torque.

The invention concerns the problem of the so-called cold start performance of a viscous friction clutch, i.e., the performance of the clutch when it is engaged after prolonged inactivity of the motor vehicle internal combustion engine. In the clutch rest phase, oil drains from the supply chamber into the working chamber such that the working chamber is partially filled and causes the cooling fan to start up when the cold internal combustion engine is started. Such a start-up is undesirable when the internal combustion engine is cold, and causes undesirable noise as well as unnecessary energy consumption. This phenomenon occurs, in particular, with electrically controlled viscous friction clutches because the electromagnetic coil of the clutch is currentless when the engine is turned off so the supply device between the supply chamber and the working chamber is open. This is required for fail-safe reasons. Measures for solving this problem, which is also referred to as "morning sickness" in the relevant English patent literature, have already been proposed, e.g., in EP 1 418 361 A2: this publication proposes an accumulator or storage body with a collection chamber for an electrically controlled viscous friction clutch, wherein said accumulator or storage body is arranged radially between the supply chamber and the working chamber of the viscous friction clutch. When the clutch is at standstill, the oil flowing down from the supply chamber due to gravity is collected in the collection chamber of the storage body and prevented from entering the working chamber. This is intended to provide an improved cold start performance independent of the angular position of the accumulator.

DE 197 53 725 C2 of the applicant discloses an electrically controlled viscous friction clutch for driving a cooling fan in a motor vehicle. The known clutch features a driving disk that is driven by the internal combustion engine of the motor vehicle and is supported in a clutch housing, on which a fan wheel is mounted. An annular supply chamber arranged in the driving disk is closed toward the outside by means of an intermediate disk, and features a valve opening that can be controlled by means of a valve lever. The valve lever is actuated by an electromagnetic coil with the aid of an armature plate. In the currentless state, the valve lever is lifted off the valve opening such that oil can flow from the supply chamber into the radially outer working chamber. The oil is returned from the working chamber into the supply chamber by means of a return device. The clutch therefore features a device for supplying and for returning oil. As mentioned above, this clutch also has the disadvantage that oil can flow from the supply chamber into the working chamber while the clutch is at standstill, so that an undesirable start-up of the cooling fan can take place when the clutch is restarted.

Based on this state of the art, the present invention aims to improve the cold start performance of viscous friction clutches of the initially cited type.

BRIEF SUMMARY OF THE INVENTION

This objective is achieved with the characteristics of claim 1. According to the invention, a portion of the annular supply chamber is realized in the form of a storage chamber for the shear fluid (silicone oil). This advantageously makes it possible to retain a sufficient portion of the shear fluid—namely about 40% of the total volume of the supply chamber—while the clutch is at standstill, so that the cold start performance of the viscous friction clutch is improved.

The supply chamber—and the storage chamber—are preferably arranged in the driving disk of the viscous friction clutch. Consequently, the oil pressure in the supply chamber is directly dependent on the speed of the internal combustion engine; likewise, the angular position of the supply chamber corresponds to the angular position of the crankshaft of the internal combustion engine.

According to one preferred embodiment, the storage chamber is realized in the form of an annular segment or ring sector that extends over approximately a quarter circle, i.e., over a circumferential angle between 90 and 100 degrees, wherein one end of the ring segment is closed, i.e., realized in the form of a bottom, and the other end is open such that oil can flow in at this location and accumulate in the storage chamber depending on the angular position of the supply chamber. The storage chamber may be realized in the form of a supplementary receptacle that is inserted into the supply chamber. This provides the advantage that such a storage chamber can also be subsequently installed into existing mass-produced viscous friction clutches. Consequently, no constructive modifications are required, i.e., such a solution is particularly cost-efficient.

According to one preferred embodiment, the supply chamber is connected to a supply bore and a return bore in the region of its outer diameter. Both bores collectively form an approximate circumferential angle of up to 30 degrees and are arranged in the region of the supply chamber adjacent to the bottom of the storage chamber. The inventive storage chamber and the additional storage receptacle in connection with the supply and return bores respectively make it possible to store approximately 30 to 40% of the supply chamber volume, independently of the angular position of the supply chamber.

According to another preferred embodiment, the annular supply chamber is divided into a front chamber and a rear chamber in the axial direction, preferably by means of an intermediate wall that extends in the radial direction. The front chamber is sealed in an oil-tight fashion with a cover plate, and the rear chamber communicates with the front chamber via a through-opening that is preferably arranged in the intermediate wall. The rear chamber communicates with at least one supply bore and at least one return bore, wherein the through-opening in the intermediate wall is arranged roughly diametrically to the adjacently arranged supply and return bores. Due to the division of the supply chamber, a storage chamber or storage volume is created in which at least 50% of the oil volume can be retained. For this purpose, the volume of the front chamber should amount to at least 50% of the total volume of the supply chamber. This means that just under 50% of the oil volume reaches the working chamber while the clutch is at standstill and the supply chamber is in an unfavorable angular position (bores on the bottom, i.e., in the 6 o'clock position). When the clutch is restarted, it initially runs up to a higher speed, but the small oil quantity is returned into the supply chamber from the working chamber within a very short period of time, so the rotational speed is immediately lowered again and an overall improvement of the cold start performance is achieved.

The inventive measures in the form of a storage volume in the supply chamber have particularly advantageous effects in electromagnetically controlled clutches because the valve in the supply chamber is open while the clutch is at standstill and the magnetic coil is currentless.

BRIEF DESCRIPTION OF THE SEVERAL VIEWS OF THE DRAWING(S)

Figure 6:
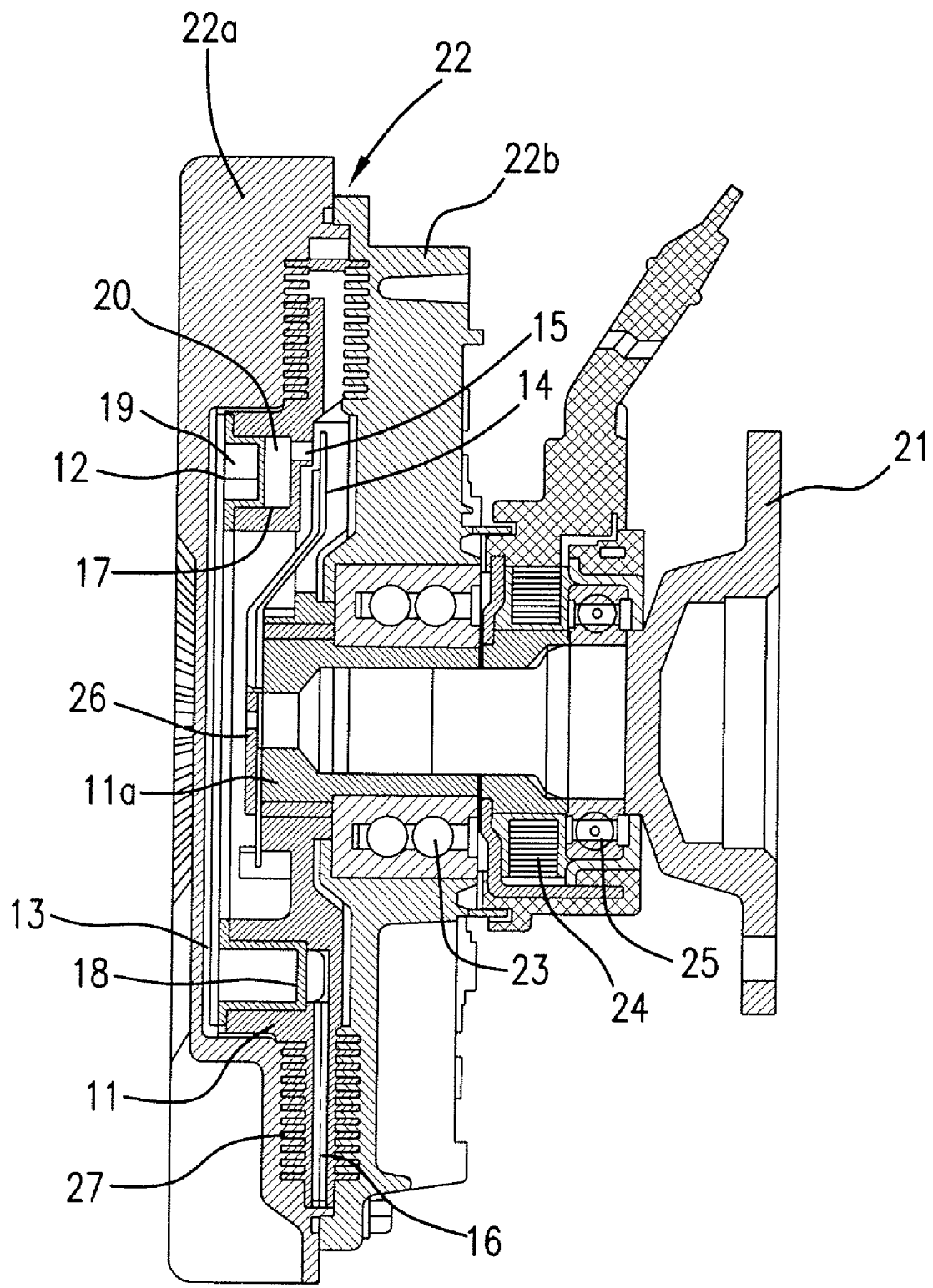
Figure 7:
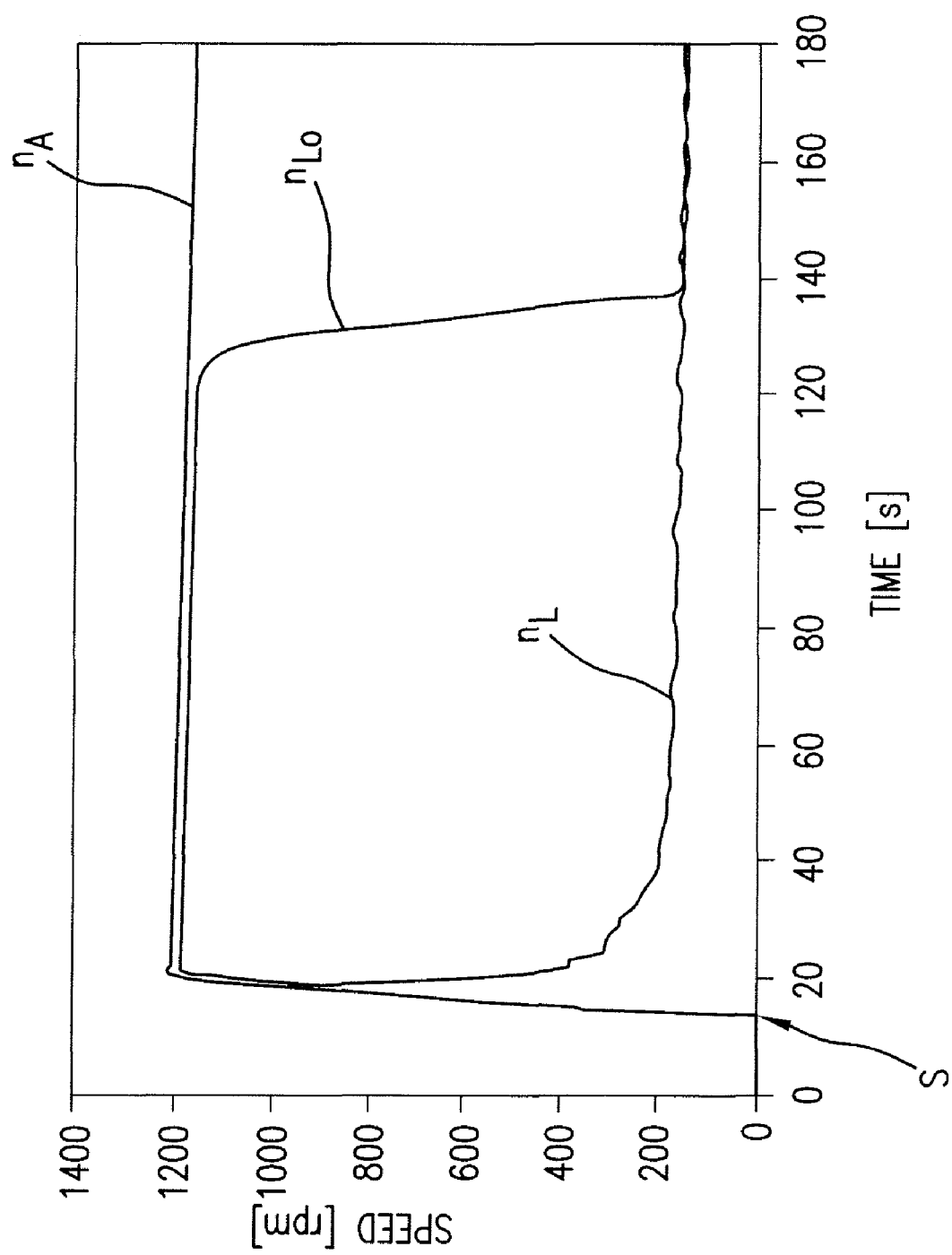

Embodiments of the invention are illustrated in the figures and are described in greater detail below. The figures show:

FIGS. 1-4, a first embodiment of the invention in the form of an annular supply chamber with a storage chamber that is divided in the circumferential direction, in various angular positions;

FIG. 5, a second embodiment of the invention in the form of a viscous friction clutch with an axially divided annular supply chamber;

FIG. 6, the viscous friction clutch according to FIG. 5 in the form of an axial section, and FIG. 7, a speed diagram for the cold start performance of a conventional clutch and a clutch according to the clutch invention.

DETAILED DESCRIPTION OF THE INVENTION

FIG. 1 shows a schematic representation of an annular supply chamber 1 of a not-shown viscous friction clutch, which can correspond to the initially-described state of the art. The annular supply chamber 1 is arranged in a not-shown driving disk or primary disk of the not-shown viscous friction clutch, and therefore is driven with the drive speed of the internal combustion engine, i.e., without slip. The supply chamber 1 has an outside diameter $D_a$ and an inside diameter $D_i$. A supply bore 2 and a return bore 3 are arranged in the region of the outside diameter $D_a$ and form part of a not-shown device for supplying silicone oil situated in the supply chamber to a not-shown working chamber of the viscous friction clutch, as well as a corresponding device for returning the silicone oil from the working chamber to the supply chamber 1. In the embodiment shown, the return bore 3 is situated in a lower position or the so-called 6 o'clock position. The supply bore 2 is arranged in the immediate vicinity of the return bore 3, i.e., at an angular spacing of approximately 30 degrees. The annular supply chamber 1 contains a storage chamber in the form of a receptacle 4 (storage receptacle) that has the shape of a ring sector and is shown with hatching, with said receptacle being filled with silicone oil 5 that is indicated with the hatching. The receptacle 4 acts as a storage chamber and accommodates the entire oil quantity situated in the supply chamber 1 in the standstill position shown. The receptacle 4 has a closed bottom 4a, and an open end face 4b through which oil can be introduced and discharged. The receptacle 4 can be inserted into the annular supply chamber 1 in the form of a supplementary receptacle, and forms a storage volume that subdivides the supply chamber 1 in the circumferential direction and extends approximately over a circumferential angle α of 90-120°, i.e., at least a quarter sector of a circle.

FIG. 2 shows a different angular position of the supply chamber 1 with completely emptied storage receptacle 4: the return bore 3 is situated in its top or so-called 12 o'clock position, i.e., offset relative to the position according to FIG. 1 by 180°. The entire oil quantity indicated by the hatching 5 is situated in the lower section (trough) of the supply chamber 1, wherein the oil level 5a is tangent to the inside diameter $D_i$ of the supply chamber 1. (At a higher oil level 5a, the oil drains from the supply chamber 1 through the central opening with the inside diameter $D_i$).

FIG. 3 shows another angular position of the supply chamber 1 with the storage receptacle 4, wherein the return bore 3 is situated in the right horizontal or so-called 3 o'clock position. The storage chamber 4 is situated in an upper position, wherein a portion of the oil quantity has drained via the open face cross section 4b and a remaining portion of the oil quantity with an upper oil level 5b is retained in the storage chamber 4. The drained oil is situated in the lower section (trough) of the supply chamber 1 and forms a lower oil level 5a. The supply bore 2 is situated directly above the oil level 5a in this case.

FIG. 4 shows another angular position of the supply chamber 1, wherein the return bore 3 is situated in the left horizontal position or 9 o'clock position. The storage chamber 4 is situated in a lower position and accommodates a large portion of the entire oil quantity—the oil level that results in this case is once again identified by the reference symbol 5a.

The oil quantity retained at clutch standstill is approximately the same in FIGS. 1 to 4 or the 6 o'clock, 12 o'clock, 3 o'clock and 9 o'clock positions—it approximately corresponds to 30-40% of the volume of the supply chamber 1.

FIG. 5 shows a second embodiment of the invention, namely a primary side subassembly 10 of a viscous friction clutch that is fully illustrated in FIG. 6. The subassembly 10 comprises a driving disk 11, also known as a primary disk, an intermediate wall 12 and a cover plate 13. A valve lever 14 is pivotably mounted on the primary disk 11 and controls the supply bore 15. A return bore 16 is arranged in the region adjacent to the supply bore 15, i.e., offset on the circumference by an angle of approximately 30°. Furthermore, an annular supply chamber 17 is also arranged in the primary disk 11, with the supply bore 15 and return bore 16 leading into this supply chamber. The intermediate wall 12 has a pot-shaped cross section that corresponds to the annular supply chamber 17 and features a through-opening 18 in its upper region, i.e., diametrically opposite to the supply bore 15. The intermediate disk 12 is inserted into the annular supply chamber 17 and divides this supply chamber into a front chamber 19 and a rear chamber 20. The cover plate 13 seals the front chamber 19.

FIG. 6 shows—in the form of an axial section—the complete viscous friction clutch into which the primary side subassembly 10 according to FIG. 5 is installed; the same reference symbols are used for identical components. The primary disk 11 features a hub 11a that is fixed on a driving shaft 21, preferably the crankshaft of the not-shown internal combustion engine, in a rotationally rigid fashion. A clutch housing 22 consisting of two housing halves 22a, 22b is supported on the hub 11a of the primary disk 11 and driving shaft 21 by means of a roller bearing 23. A magnetic coil 24 is stationarily arranged adjacent to the rear housing half 22b and is supported relative to the driving shaft 21 with a bearing 25. The valve lever 14 that is pivotably arranged on the end face of the driving shaft 21 and the hub 11a has an armature plate 26 that is attracted when the magnetic coil 24 is energized with a current, such that the valve lever 14 closes the supply bore 15. In the position shown, the supply bore 15 is open, i.e., the valve lever 14 is lifted off the supply bore 15 and the magnetic coil 24 is currentless. This position corresponds to the fail-safe position, i.e., the clutch needs to be engaged if a power failure occurs in order to maintain cooling of the engine. Details regarding the electromagnetic actuation of the valve lever 14 by means of the magnetic coil 24 are disclosed, in principle, in the initially cited publication DE 197 53 725 C2, to which the application hereby refers. The annular supply chamber 17 is divided into a front chamber 19 and a rear chamber 20 as illustrated in the upper portion of the axial section in FIG. 6, wherein the intermediate wall 12 forms a partition wall and the front chamber 19 forms a storage volume. The supply bore 15 is illustrated in the upper half while the return bore 16 is shown offset in the lower half of the axial section—this consequently does not correspond to the actual position that is in fact illustrated in FIG. 5. The through-opening 18 is arranged diametrically opposite the supply bore 15. The primary disk 11 forms a working chamber 27 together with the clutch housing 22, wherein said working chamber conventionally consists of engaging ring lands and ring grooves that collectively form annular gaps filled with a shear fluid, preferably silicone oil. The oil is supplied to the working chamber 27 through the supply bore 15 and is transported back through the return bore 16 by means of a not-shown pump mechanism. The supply bore 15 and the return bore 16 are both connected to the rear chamber 20. A not-shown cooling fan for cooling the internal combustion engine is mounted on the housing 22 that represents the driven side of the clutch.

The clutch functions as described below. As mentioned above, the drawing (FIG. 6) shows the clutch in the engaged state, i.e., the magnetic coil 24 is currentless and the supply bore 15 is open. When the clutch is driven, oil flows out of the rear chamber 20 and into the working chamber 27. Oil can simultaneously flow in from the front chamber 19 via the through-opening 18. The oil is continuously transported back from the working chamber 27 into the supply chamber, i.e., the rear chamber 20, through the return bore 16. This means that an oil circulation takes place between the supply chamber and the working chamber. If the clutch is disengaged, e.g., when a low coolant temperature is reached, the magnetic coil 24 is acted upon with a current such that the valve lever 14 is attracted by the armature plate 26 and closes the supply bore 15. The oil still situated in the working chamber 27 is completely pumped out through the return bore 16 and initially transported into the rear chamber 20 and then into the front chamber 19. When the engine of the motor vehicle is turned off, the magnetic coil 24 is also rendered currentless and the valve lever 14 drops so that the supply bore 15 is opened. Depending on the angular position of the primary disk 11 and the bores 15, 16, oil can then be transferred from the rear chamber 20 into the working chamber 27. This instance occurs, in particular, when the supply bore 15 and/or the return bore 16 is/are situated in a lower position, i.e., in the 6 o'clock position. According to the invention, the supply chamber 17 is not completely emptied because only the oil quantity situated in the rear chamber 20 can be transferred into the working chamber 27. The equalization opening 18 is situated in the 12 o'clock position, i.e., on top, when the supply bore 15 is situated in the 6 o'clock position. Consequently, oil can no longer flow in from the front chamber 19 that represents the storage chamber. On the contrary, the oil quantity situated in the front chamber 19 is retained therein. Depending on the division of the two chambers 19, 20, the oil quantity retained in the front chamber 19 amounts to approximately 50% of the total oil quantity or even more. In this worst-case scenario, only a relatively small oil quantity that amounts to less than 50% of the total oil quantity is situated in the working chamber 27 when the engine is started after a prolonged period of inactivity. Although the clutch briefly runs up to a higher speed when the engine is started, the oil in the working chamber 27 is pumped back into the rear chamber 20 relatively quickly when the supply bore 15 is closed. This causes the output speed of the clutch to drop back to the idle speed.

FIG. 7 shows various speeds as a function of time, namely the drive speed $n_A$, the cooling fan speed $n_{L0}$ according to the state of the art, and the cooling fan speed $n_L$ for the oil storage in the supply chamber of the invention. When the engine is started, as indicated by the arrow S on the time axis, the drive speed $n_A$ increases in a relatively steep fashion and remains at a level of approximately 1200 revolutions/minute. This is the speed above which the cooling fan becomes clearly audible in the cabin, particularly of heavy trucks, and therefore leads to annoying noise. The idle speed is lower than 1200 rpm. The cooling fan speed $n_{L0}$ initially runs up with the drive speed $n_A$, namely to almost the same speed level (the speed difference corresponds to the clutch slip). After approximately 100 seconds, i.e., at approximately 120 seconds on the time axis, the speed $n_{L0}$ drops to approximately 200 revolutions/minute because the working chamber 27 was not emptied until this time had elapsed. In contrast, in the of the clutch of the invention with oil storage in the supply chamber, the speed $n_L$ only increases briefly to a value of approximately 900 revolutions/minute and drops back to an idle speed of approximately 200 revolutions/minute immediately after this peak value is reached. The difference in comparison with the clutch according to the state of the art is very obvious, i.e., the cold start performance of the inventive clutch is significantly improved: undesirable noise and unnecessary energy consumption are prevented in this fashion. The speed graphs shown are based on measurements that were carried out by the applicant.

The invention claimed is:

1. A viscous friction clutch for driving a cooling fan in a motor vehicle, comprising a driving disk and a housing, an annular supply chamber and a working chamber, a supply device for supplying shear fluid from the supply chamber into the working chamber and a return device for returning the shear fluid from the working chamber to the supply chamber wherein part of the supply chamber includes a storage chamber for the shear fluid, the storage chamber being separated from the working chamber by a remainder of the supply chamber.

2. The viscous friction clutch according to claim 1, wherein the supply chamber is arranged in the driving disk.

3. The viscous friction clutch according to claim 1, wherein the storage chamber comprises an annular segment.

4. The viscous friction clutch according to claim 3, wherein the annular segment of the storage chamber is formed as a supplementary receptacle.

5. The viscous friction clutch according to claim 3, wherein the supply chamber includes at least one supply bore and at least one return bore, the bores respectively forming part of the supply device and return device.

6. The viscous friction clutch according to claim 5, wherein the supply and return bores are arranged in a region of the outside diameter ($D_a$) of the supply chamber.

7. The viscous friction clutch according to claim 3, wherein the annular segment extends over a circumferential angle $\alpha$, wherein $\alpha$ is in a range of 90° to 120°.

8. The viscous friction clutch according to claim 7, wherein $\alpha > 100°$.

9. The viscous friction clutch according to claim 1, wherein the supply chamber is divided into a front chamber and a rear chamber in the axial direction, and the front chamber forms the storage chamber.

10. The viscous friction clutch according to claim 9, wherein the front and the rear chambers are divided by an intermediate wall.

11. The viscous friction clutch according to claim 9, further comprising a cover plate, wherein the front chamber is closed with the cover plate.

12. The viscous friction clutch according to claim 9, wherein the front and the rear chambers communicate with one another.

13. The viscous friction clutch according to claim 12, wherein the supply chamber further comprises an intermediate wall, and the intermediate wall contains at least one through-opening, through which the front and rear chambers communicate.

14. The viscous friction clutch according to claim 9, wherein the rear chamber communicates with the devices for supplying and returning the shear fluid.

15. The viscous friction clutch according to claim 14, wherein the supply device includes at least one supply bore arranged in a region of the rear chamber.

16. The viscous friction clutch according to claim 15, further comprising at least one through-opening, wherein the through-opening is essentially arranged diametrically opposite to the supply bore.

17. The viscous friction clutch according to claim 14, wherein the return device includes at least one return bore arranged in a region of the rear chamber.

18. The viscous friction clutch according to claim 17, further comprising at least one through-opening, wherein the through-opening is essentially arranged diametrically opposite to the return bore.

19. The viscous friction clutch according to claim 14, further comprising at least one through-opening, and at least one supply bore and at least one return bore, the supply bore and return bore being arranged in a region of the rear chamber, wherein the through-opening is essentially arranged diametrically opposite to the supply and return bores.

20. The viscous friction clutch according to claim 1, wherein the device for supplying shear fluid comprises an electromagnetically controlled device.

\* \* \* \* \*